United States Patent [19]
Kleinsorgen et al.

[11] Patent Number: 5,858,061
[45] Date of Patent: Jan. 12, 1999

[54] PROCESS FOR THE RECOVERY OF METALS FROM USED NICKEL/METAL HYDRIDE STORAGE BATTERIES

[75] Inventors: Klaus Kleinsorgen; Uwe Köhler, both of Kelkheim, Germany; Alexander Bouvier, Krumpendorf; Andreas Fölzer, Treibach-Althofen, both of Austria

[73] Assignee: Varta Batterie Atkiengesellschaft, Hanover, Germany

[21] Appl. No.: 896,512

[22] Filed: Jun. 16, 1997

[30] Foreign Application Priority Data

Dec. 20, 1994 [DE] Germany ............... 44 45 496.1
Dec. 20, 1994 [WO] WIPO ............... PCT/EP95/04735

[51] Int. Cl.[6] ............... C22B 3/00; H01M 10/54
[52] U.S. Cl. ............... 75/711; 429/49
[58] Field of Search ............... 75/710, 711, 416; 429/49; 423/139

[56] References Cited

U.S. PATENT DOCUMENTS

| | | | |
|---|---|---|---|
| 4,041,125 | 8/1977 | Alstad et al. | 75/711 |
| 4,162,296 | 7/1979 | Muller et al. | 423/139 |
| 4,439,284 | 3/1984 | Walter | 204/43 T |
| 4,975,253 | 12/1990 | Monzyk et al. | 75/711 |
| 5,129,945 | 7/1992 | Lyman et al. | 75/416 |
| 5,429,887 | 7/1995 | Lyman et al. | 429/49 |
| 5,478,664 | 12/1995 | Kaneko et al. | 429/49 |

*Primary Examiner*—Scott Kastler
*Attorney, Agent, or Firm*—Weiser and Associates, P.C.

[57] ABSTRACT

In the recycling of used nickel/metal hydride storage batteries, the battery scrap is dissolved in sulphuric acid after mechanical separation of the coarse constituents by magnetic and air separation. A solvent extraction is performed with the digestion solution, from which the rare earths (from the hydrogen-storage alloys in the negative electrodes) and iron and aluminum have been selected by precipitation, under conditions pH, choice of solvent, volumetric ratio of the phases) which are such that the aqueous phase contains nickel and cobalt in the same atomic ratio as that in which they were present in the scrap. This makes possible a joint recovery by simultaneous electrolysis, in which process the deposition product forms a master alloy which can be used, together with the precipitated rare earths which have been electrometallurgically reprocessed as misch metal, for the production of fresh hydrogen-storage alloys.

28 Claims, No Drawings

PROCESS FOR THE RECOVERY OF METALS FROM USED NICKEL/METAL HYDRIDE STORAGE BATTERIES

BACKGROUND OF THE INVENTION

1. Field of the Invention

The invention relates to a process for the recovery of metals from used nickel/metal hydride storage batteries, in which, after separating the rare earth metals as double salts from an acid digestion solution of the storage battery scrap and subsequent removal of the iron by raising the pH, the filtrate from the iron precipitation is subjected to a liquid/liquid extraction with an organic extractant for the purpose of recovering further metals, such as zinc, cadmium, manganese, aluminium and residues of iron and rare earths.

2. Description of the Related Art

Nickel/metal hydride storage batteries are electrochemical energy stores which, compared with other storage batteries such as, for example, the lead storage battery or the nickel/cadmium storage battery, have a higher storage capacity. These storage systems are therefore increasingly widespread not only for the mains-independent supply of energy to appliances in entertainment electronics, toys and the like, for example in the form of button cells, but also in vehicle drives in large-size battery casings.

The gastight casing, formed from sheet steel, of nickel/metal hydride storage batteries accommodates one or more positive electrodes, one or more negative electrodes and separators, seals and electrolyte.

A positive electrode is conventionally composed of a support and the active mass. Depending on electrode type, gauzes, expanded metal, perforated metal sheet, nonwoven fabric or highly porous metal foams are common as supports. The support material is nickel or nickel-plated iron. The active mass is a mixture of nickel hydroxide and cobalt oxide and, possibly, cobalt. In addition to binders and conducting agents, the mixture may contain further metals, including zinc, as hydroxides in lesser amounts.

A negative electrode is likewise composed of support and active mass. In this case, the latter is a hydrogen-storage alloy. Hydrogen-storage alloys are intermetallic compounds which can be assigned to a $AB_5$ type on the basis of the simple starting alloy $LaNi_5$ or to an $AB_2$ type in accordance with the simple alloy $TiNi_2$.

Hydrogen-storage alloys of the $AB_5$ type for nickel/metal hydride storage batteries are conventionally composed of 45–55% Ni, 30–35% rare earths (REs), 5–15% Co, 2–5% Mn and 1–4% Al.

The valuable content substances of said storage batteries make their recovery from waste batteries a particularly urgent requirement.

Many processes are already known for processing used storage batteries, directed in particular at the acidic lead storage batteries. Of these, the processing methods for lead/acid storage batteries are of little interest here because they are remote from the subject of the invention.

Common to most of the other recycling processes, however, are the preparatory steps which comprise pre-sorting the battery scrap supplied in accordance with certain criteria such as cell size, cell shape (round cells, prism-shaped cells, button cells), that it is comminuted mechanically by shredding, that the iron (and the nickel) originating from the casings is separated from the comminuted and optionally washed scrap material, and that the shredder material is finally dissolved in acid for the purpose of wet-chemical further processing. The metals present are then separated in a sequence of fractionated precipitations and extraction processes from this digestion solution or solution of valuable substances and, finally, recovered by electrolytic deposition.

A very complicated separation process which, because it proceeds from unsorted battery scrap and consequently also has to take substances such as copper and mercury, which are absent in alkaline storage batteries, into consideration is described in German Docket Specification 42 24 884. In this process use is made of a liquid/liquid extraction for the selective separation of Zn ions from a fraction of the digestion solution, an organic extractant being fed into a mixer/settler unit as selection phase. Ni and Cd remain behind in the Zn-free solution.

The liquid/liquid extraction also plays an important part, however, in other known processes which were specifically developed for the waste disposal of nickel/cadmium batteries.

According to PCT Publication No. WO 92 03853, the filtered digestion solution, acidified with HCl, of Ni/Cd battery scrap is freed from Cd by counter-flow solvent extraction with 75% by volume of tributyl phosphate (TBP) and 25% by volume of aliphatic hydrocarbon and the Cd is made accessible to electrolytic deposition by so-called stripping (transfer to an aqueous acidic phase).

European Patent EP-A-585 701 provides a separate extraction of Ni and Cd from a fine fraction dissolved in HCl, which fine fraction is obtained, in addition to a magnetic fraction (Fe and Ni) and a light fragment formed from polymers (from casings, separators, bindings) by air separation.

A recycling process which relates specifically to the recovery of rare earths and transition metals from used alloys is the subject of U.S. Pat. No. 5,129,945. In the latter, a solvent extraction is also carried out for the purpose of separating Fe residues from the digestion solution, which Fe residues have entered the filtrate from the preceding hydroxide precipitation. In this case, Co is left behind in the aqueous phase.

In all these known processes, measures are taken which are intended to isolate the metallic constituents, as far as possible individually, in a systematic separation process and to recover the pure metal from the metal compound separated as salt or hydroxide using a reducing agent. Suitable for this latter step are metallothermic or electrolytic processes.

In this way, the iron is indeed returned to the steel industry again; nickel, cobalt and cadmium each return to the production of the battery manufacturer, but each metal is separated separately so that, to produce fresh electrode material, suitable mixtures composed of the refined materials have to be preprocessed again.

SUMMARY OF THE INVENTION

The object of the invention is to obtain, from used nickel/metal hydride storage batteries, products which are particularly well suited for the production of hydrogen-storage alloys.

According to the invention, the object is achieved by a process as defined in Patent claim 1.

According to the invention, a liquid/liquid extraction is carried out in regard to the choice of extractant and of pH of the digestion solution in such a way that the metals nickel and cobalt are completely dissolved in the aqueous phase and remain behind in the same atomic ratio as that in which they were present in the storage battery scrap.

The measure according to the invention is at the same time linked to the preparatory process steps which are described in the U.S. Pat. No. 5,129,945 mentioned last.

DETAILED DESCRIPTION

Accordingly, a scrap material formed largely from rare earths is dissolved by leaching with 2 to 2.5M $H_2SO_4$, the solution containing in addition to the rare earths also further transition metals, in particular Fe, Ni and Co.

In order to prevent any iron being coprecipitated as basic sulphate in the subsequently described double sulphate precipitation of the rare earths, $Fe^{3+}$ present must be reduced. This is done by passing the digestion solution repeatedly over the metallic iron mechanically separated as magnetic fraction (coarse fraction).

The rare earths are precipitated as very sparingly soluble double salts of the composition $(RE)_2 (SO_4)_3 \cdot Na_2SO_4 \cdot xH_2O$ from the strongly acidic solution by addition of NaOH or $NH_4OH$, in which process the pH rises to 1.5 to 2.0.

The precipitate filtered off is dissolved in acid, a rare earth chloride or rare earth oxide is obtained from this solution and is subjected in an electrometallurgical reduction to the rare earth metal or to a mixture of a plurality of the same (misch metal).

The filtrate from the double sulphate precipitation contains the transition metals not belonging to the group of the rare earths, and also aluminium and possibly small residues of rare earths. As a result of raising the pH to approximately 4 to 4.5, iron is next precipitated in the form of a base sulphate (jarosite) or hydroxide and possibly aluminium as $Al(OH)_3$. To ensure that all the iron enters the precipitate in the 3-valent form, an oxidizing agent, preferably $H_2O_2$, is added to the solution beforehand.

The step subsequent to the Fe and Al precipitation of purifying residual metals and extraneous metals (incorrect sorting) is an extraction stage which leaves only Co and Ni in the aqueous solution and separates off undesired elements jointly. Phosphorus-containing cation exchangers in conjunction with an organic solvent are preferably suitable as extractants.

In order to make it possible to obtain a final product from the processing operation which can be directly recycled for the production of fresh hydrogen-storage electrodes, it is advantageous, according to the invention, to carry out a liquid/liquid extraction following the Fe and Al hydroxide precipitation. This is conducted in such a way that only nickel and cobalt are left behind in the aqueous phase and are present therein in the same atomic ratio as that in which they have been present in the scrap processed. This also has the consequence that all the accompanying metals, not hitherto removed, from the scrap of Ni/metal hydride batteries together with occasional incorrectly sorted batteries (alkali manganese, NiCd, NiNeH cells containing $AB_2$ alloys), in particular Zn, Cd, Mn, Cr and entrained residues of Fe, Al and rare earths are transferred to the organic phase during the extraction. The organic phase laden with the salts of the said elements is treated further for the purpose of recovering the metals by known methods.

Interferences in the extraction process may occur if the original iron content of the digestion solution is higher than 0.05 g/l. The prior elimination of iron (and aluminium) is therefore absolutely necessary.

The solvent extraction according to the invention is a "purification extraction" since it completely excludes all the metal residues from the digestion solution with the exception of the metals Ni and Co which are not covered. To carry it out, the pH of the digestion solution (filtrate after the Fe and Al hydroxide is precipitation) is adjusted to values from pH 3 to pH 4, preferably to approximately pH 3.5 by adding alkali and the solution is repeatedly brought into intimate contact, in particular in a multi-stage counterflow system, with a mixture of diethylhexylphosphoric acid, isotridecanol and an aliphatic hydrocarbon as diluent in the ratio of 30:10:60. The contact is promoted by stirring in a mixer. According to the invention, the aqueous phase and the solvent phase should be in a ratio by volume of 1:1 or more during this process.

After the elements Mn, Cd, Fe, Al, Zn, Cr and the rare earths have been quantitatively removed from the digestion solution by the measure according to the invention, in which process the main quantity of rare earths has already been separated by the preceding double sulphate precipitation and the main quantity of Fe and Al by hydroxide precipitation, Ni and Co can be recovered jointly from the aqueous phase.

The methods below are in principle suitable for the Ni and Co recovery.

Thus, the pH of the aqueous phase can be raised further to values of approximately 10 by adding sodium hydroxide and/or sodium carbonate. In this process, the metals are completely precipitated in the form of hydroxides or carbonates. Before the further processing, these are dried in a drying oven at 100° C. to 200° C. and then roasted at 400° C. to 1000° C. and thereafter smelted in an arc furnace with reducing agents such as aluminium or carbon, i.e. by a metallothermic or carbothermic process, to produce an Ni/Co alloy.

A second possibility is recovery by simultaneous electrolysis. Since the electrochemical deposition potentials of Ni and Co are very similar, an alloy of the two elements can be deposited from an aqueous solution in the ratio of their concentration in the solution. A master alloy can be produced by annealing the mixture.

Products which are suitable for the production of hydrogen-storage alloys are obtained both from the reducing melt and also by the simultaneous electrolysis since they contain both elements in the same ratio as the hydrogen-storage alloy of the used nickel/metal hydride storage battery. They can therefore be delivered to the alloy producer directly for the production of a master alloy. At the same time, it is not necessary in the case of the electrolytic deposition product to control the $Ni^{2+}/Co^{2+}$ ratio during the electrolysis by means of special measures such as those described, for example, in German Patent Specification 31 23 833 in such a way that a completely homogeneous alloy material is deposited since the homogeneity of the master alloy is established during the remelting.

The master alloy smelted in the arc furnace can now be remelted together with the rare earths worked up from the double sulphate precipitation in a vacuum induction crucible furnace or in a vacuum arc furnace to produce hydrogen storage alloy which may serve again to produce fresh nickel/metal hydride storage batteries.

The RE double sulphate is dissolved beforehand in acid and is reprecipitated to form the carbonate, the sodium remaining in solution. The carbonate can be dissolved in HCl and RE chloride, which is reduced in a molten-salt electrolysis to misch metal, is obtained by evaporation.

The aqueous electrolysis of nickel and cobalt can be carried out in an electrolysis cell with a membrane (so-called Hybinette cell). While maintaining the electrolysis conditions such as those conventional for the large-scale industrial performance of a nickel production electrolysis in Hybinette cells, a Ni/Co alloy is deposited with a current yield of more than 90%.

As a result of the liquid/liquid extraction according to the invention and the recovery of Ni and Co in the form of a master alloy for hydrogen-storage alloys, the production of fresh nickel/metal hydride accumulators from scrap material acquires a very favourable economic basis.

It is within the scope of the invention to make possible the production of other cell components from recycled material. This applies, in particular, to the positive electrodes, insofar as their active material also contains Ni and Co in a similar quantitative ratio to that of the negative electrode in its hydrogen-storage alloy.

In order to utilize the recovery process for these cell constituents as well, according to the invention, some of the weakly acidic digestion solution can be tapped off after the solvent extraction for a separate recovery of the metals Ni and Co still exclusively contained in it. Ni and Co can also be separated by a liquid/liquid extraction by known processes.

The element absorbed from the organic phase in each case is transferred to an aqueous phase again by "stripping" and either electrolytically deposited from the latter or precipitated as carbonate. The pure metal is again obtained from the latter by aluminothermic or carbothermic reduction.

The recycling of nickel and cobalt by the novel process via a "purification extraction" stage is primarily tailored to the recycling of the most valuable constituents of nickel/metal hydride storage batteries, namely the hydrogen-storage alloys of their negative electrodes. As a result of the optional individual recovery of nickel it is also possibly to prepare fresh nickel hydroxide and support material, to produce which the battery producer would otherwise have to use other raw-material sources. The same applies to cobalt, which is added to the positive electrode mass as an additive. In this connection, the performance of the process proves to be substantially insensitive even to untypical admixtures in the scrap, for example used Ni/Cd batteries or alkali-manganese batteries, when these are received for recycling in a minor amount as a result of incorrect sorting.

Existing installations can advantageously be utilized for the electrolysis of nickel and cobalt in the separate recovery of these metals by liquid/liquid solvent extraction.

We claim:

1. A process for recovering metals from used nickel/metal hydride storage batteries, comprising the steps of:
   (a) acidically digesting storage battery scrap to form an aqueous phase;
   (b) separating rare earth metals from the aqueous phase as double sulphates;
   (c) precipitating iron from the aqueous phase by increasing pH; and
   (d) subjecting filtrate from the iron precipitation to a liquid/liquid extraction with an organic extractant to recover further metals, comprising at least one of zinc, cadmium, manganese, aluminium, and residues of iron and rare earths, wherein the extractant and the pH are chosen such that, after the extraction, substantially only nickel and cobalt remain dissolved in the aqueous phase and remain in the same atomic ratio as that in which they were present in the storage battery scrap.

2. The process of claim 1, wherein the organic extractant comprises a cationic exchanger and a diluent.

3. The process of claim 2, wherein the organic extractant is formed from a mixture of diethylhexylphosphoric acid (DEHPA) with isotridecanol and an aliphatic hydrocarbon in the ratio of 30:10:60.

4. The process of claim 3, wherein the extraction is carried out at a pH in a starting solution of pH 3.5.

5. The process of claim 2, wherein the extraction is carried out at a pH in a starting solution of between pH 3 and pH 4.

6. The process of claim 5, wherein the nickel and cobalt are jointly deposited as nickel/cobalt alloy from the aqueous phase treated with the extractant.

7. The process of claim 6, wherein the nickel/cobalt alloy is used as master alloy in addition to misch metal for production of a fresh hydrogen-storage alloy.

8. The process of claim 5, wherein the nickel and cobalt are separately recovered from the aqueous phase after the extraction.

9. The process of claim 2, wherein the nickel and cobalt are jointly deposited as nickel/cobalt alloy from the aqueous phase treated with the extractant.

10. The process of claim 9, wherein the nickel/cobalt alloy is used as master alloy in addition to misch metal for production of a fresh hydrogen-storage alloy.

11. The process of claim 2, wherein the nickel and cobalt are separately recovered from the aqueous phase after the extraction.

12. The process of claim 10, wherein the extraction is carried out at a pH in a starting solution of between pH 3 and pH 4.

13. The process of claim 12, wherein the extraction is carried out at pH 3.5.

14. The process of claim 12, wherein the nickel and cobalt are jointly deposited as nickel/cobalt alloy from the aqueous phase treated with the extractant.

15. The process of claim 14, wherein the nickel/cobalt alloy is used as master alloy in addition to misch metal for production of a fresh hydrogen-storage alloy.

16. The process of claim 12, wherein the nickel and cobalt are separately recovered from the aqueous phase after the extraction.

17. The process of claim 1, wherein the nickel and cobalt are jointly deposited as nickel/cobalt alloy from the aqueous phase treated with the extractant.

18. The process of claim 17, wherein the nickel/cobalt alloy is deposited in the ratio of the concentrations of the nickel and cobalt in the aqueous phase.

19. The process of claim 18, wherein the ratio of nickel and cobalt in the alloy corresponds to the same ratio as that in which the nickel and cobalt occur in nickel/metal hydride storage batteries.

20. The process of claim 19, wherein the nickel/cobalt alloy is used as master alloy in addition to misch metal for production of a fresh hydrogen-storage alloy.

21. The process of claim 18, wherein the nickel/cobalt alloy is used as master alloy in addition to misch metal for production of a fresh hydrogen-storage alloy.

22. The process of claim 17, wherein the ratio of nickel and cobalt in the alloy corresponds to the same ratio as that in which the nickel and cobalt occur in nickel/metal hydride storage batteries.

23. The process of claim 22, wherein the nickel/cobalt alloy is used as master alloy in addition to misch metal for production of a fresh hydrogen-storage alloy.

24. The process of claim 22, wherein the organic extractant comprises a cationic exchanger and a diluent.

25. The process of claim 22, wherein the extraction is carried out at a pH in a starting solution of between pH 3 and pH 4.

26. The process of claim 25, wherein the organic extractant comprises a cationic exchanger and a diluent.

27. The process of claim 17, wherein the nickel/cobalt alloy is used as master alloy in addition to misch metal for production of a fresh hydrogen-storage alloy.

28. The process of claim 1, wherein the nickel and cobalt are separately recovered from the aqueous phase after the extraction.

* * * * *

UNITED STATES PATENT AND TRADEMARK OFFICE
CERTIFICATE OF CORRECTION

PATENT NO. : 5,858,061
DATED : January 12, 1999
INVENTOR(S) : Klaus et al.

It is certified that error appears in the above-identified patent and that said Letters Patent is hereby corrected as shown below: On the title page,
Item 73, Assignee, Varta Batterie Aktiengesellschaft
                              Hannover, Germany Signed and Sealed this First Day of June, 1999

Attest:

Q. TODD DICKINSON

*Attesting Officer*          *Acting Commissioner of Patents and Trademarks*